US009511441B2

(12) United States Patent
Cole et al.

(10) Patent No.: US 9,511,441 B2
(45) Date of Patent: Dec. 6, 2016

(54) SYSTEM AND METHOD FOR HOT WIRE ARC STEERING

(71) Applicant: LINCOLN GLOBAL, INC., City of Industry, CA (US)

(72) Inventors: Stephen R. Cole, Chula Vista, CA (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 422 days.

(21) Appl. No.: 13/960,856

(22) Filed: Aug. 7, 2013

(65) Prior Publication Data
US 2015/0001184 A1    Jan. 1, 2015

Related U.S. Application Data

(60) Provisional application No. 61/839,629, filed on Jun. 26, 2013.

(51) Int. Cl.
B23K 9/08    (2006.01)
B23K 9/173   (2006.01)
(Continued)

(52) U.S. Cl.
CPC .............. B23K 9/08 (2013.01); B23K 9/0286 (2013.01); B23K 9/0737 (2013.01); B23K 9/124 (2013.01);
(Continued)

(58) Field of Classification Search
CPC ....... B23K 9/0286; B23K 9/0737; B23K 9/08; B23K 9/124; B23K 9/167; B23K 9/173; B23K 9/1735; B23K 9/091
See application file for complete search history.

(56) References Cited

U.S. PATENT DOCUMENTS 2,844,705 A  *  7/1958  Bowman ............... B23K 9/0253
                                                        219/123
3,274,371 A  *  9/1966  Saenger, Jr. .............. B23K 9/04
                                                        219/137 R
(Continued)

FOREIGN PATENT DOCUMENTS

DE    102007017225 A1  *  9/2008
EP          1658919         5/2006
JP       62-207583 A   *  9/1987

OTHER PUBLICATIONS

Machine translation of DE102007017225, Jun. 2016.*

Primary Examiner — Geoffrey S Evans
(74) Attorney, Agent, or Firm — Tucker Ellis LLP; Carlos Garritano; Evan Perry

(57) ABSTRACT

The invention described herein generally pertains to a system and method related to influencing a direction of an arc within a welding operation. Within a hot wire welding operation, an arc is generated between an electrode and a workpiece and a welding wire is energized while being supplied to a puddle formed by the electrode in order to deposit the liquefied welding wire onto the workpiece. A welder system and/or method is provided that controls a direction of the arc based on at least one of a polarity of the welding wire (via a power supply that energizes the welding wire), a location of the welding wire in proximity to the arc, a synchronization and/or de-synchronization of a polarity of the welding wire with the electrode, an activation and/or a de-activation of energizing of the welding wire, or a combination thereof.

19 Claims, 9 Drawing Sheets

(51) Int. Cl.
B23K 9/167 (2006.01)
B23K 9/028 (2006.01)
B23K 9/073 (2006.01)
B23K 9/12 (2006.01)

(52) U.S. Cl.
CPC .............. B23K 9/167 (2013.01); B23K 9/173 (2013.01); B23K 9/1735 (2013.01)

(56) References Cited

U.S. PATENT DOCUMENTS

| | | | |
|---|---|---|---|
| 3,551,637 A * | 12/1970 | Lampson | B23K 9/0737 |
| | | | 219/123 |
| 3,617,687 A | 11/1971 | Katawoka | |
| 4,366,362 A * | 12/1982 | Ohta | B23K 9/167 |
| | | | 219/130.51 |
| 4,553,018 A | 11/1985 | Kondo et al. | |
| 4,649,250 A * | 3/1987 | Kazlauskas | B23K 37/0217 |
| | | | 219/60 R |
| 4,963,715 A | 10/1990 | Tuttle | |
| 4,975,558 A * | 12/1990 | Lukens | B23K 9/08 |
| | | | 219/123 |
| 5,126,523 A * | 6/1992 | Rinaldi | B23K 37/0533 |
| | | | 219/60 R |
| 5,245,546 A | 9/1993 | Iceland | |
| 6,723,954 B2 | 4/2004 | Nikodym et al. | |
| 2008/0230528 A1* | 9/2008 | Wilhelm | B23K 9/08 |
| | | | 219/137 R |
| 2010/0288742 A1 | 11/2010 | Nishikawa et al. | |
| 2011/0163075 A1 | 7/2011 | Fujiuchi et al. | |
| 2013/0034384 A1 | 2/2013 | Hiraoka et al. | |
| 2013/0126501 A1 | 5/2013 | Fujiuchi et al. | |

\* cited by examiner

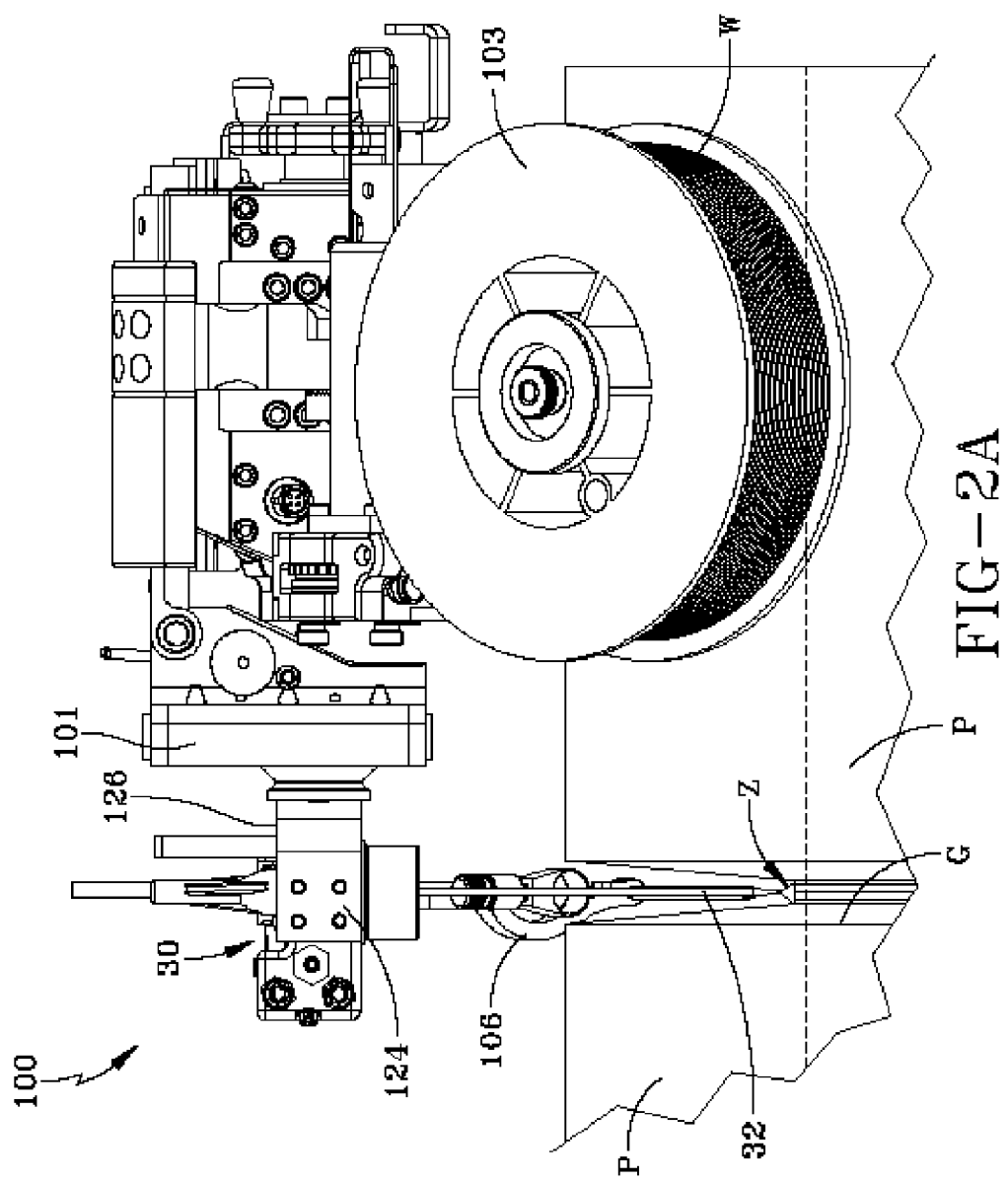

SYSTEM AND METHOD FOR HOT WIRE ARC STEERING

PRIORITY

This application claims the benefit of priority to U.S. Provisional Application Ser. No. 61/839,629, filed Jun. 26, 2013, and entitled "SYSTEM AND METHOD FOR HOT WIRE ARC STEERING." The entirety of the aforementioned application is incorporated herein by reference.

TECHNICAL FIELD

In general, the present invention relates to an orbital welding system or a non-orbital welding system. More particularly, the present invention relates to a controlling a direction of an arc in a welding operation with at least one of a current or a welding wire location in proximity to the arc.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, among others). The hot wire welding process includes the resistance heating of the up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve, raising, cladding, building up, filling, hard facing, overlaying, joining, and other welding applications. When confronted with a workpiece having a curved surface, an orbital welding processes may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep grove geometries where the welding electrode extends into a grove formed between the two pipes being joined to lay down successive beads of weld material to fill the grove the join the thick walled pipes. Orbital welding systems may include a welding head that is mounted on a guide track or a fixture that clamps or is otherwise supported on the workpiece and rotated to supply a weld. With orbital welding often involves limited visibility of a welding zone with lead cameras and/or trailing cameras.

Fusion into a sidewall of a joint or a more narrow "V" groove can lead to pockets of a lack of material (e.g., weld deposit) that should be existent therein. These pockets require repair by grounding out or being re-welded. In either of orbital welding systems or non-orbital welding systems, lack of fusion, among other welding defects, requires repair which can add costs to a welding job as well as an increase in time for welding job completion. Lack of fusion can be defined as the poor adhesion of a weld bead to a base metal and incomplete penetration is a weld bead that does not start at a root of a weld groove. Further, welding techniques are attempting to minimize the total amount of welding by decreasing a width of a joint (e.g., more narrow "V" groove) which translates into a steeper sidewall. A steeper sidewall is harder to penetrate into during a welding operation.

Orbital welding systems and non-orbital welding systems can be compromised by the deep grove geometries steeper sidewalls with a workpiece and what is needed is an improved technique to related to preventing lack of fusion during a welding operation.

SUMMARY OF THE INVENTION

In accordance with an embodiment of the present invention, a welder system is provided that includes a welding torch that includes an electrode adapted to form a weld joint on a workpiece. The welder system further includes a power source that creates an arc between the electrode and the workpiece. The welder system includes a wire feeder that is connected to a supply of welding wire to provide a welding wire to the arc, wherein the arc is a first polarity. The welder system includes a welding wire power supply that energizes the welding wire with at least one of the first polarity or a second polarity thereby influencing a direction of the arc. The welder system includes a controller that influences the direction of the arc with at least one of a strength or a polarity of the energized welding wire via the welding wire power source, wherein a magnitude of the direction is controlled by a magnetic field of the welding wire and the magnetic field is controlled by a current in the welding wire via the welding wire power source.

In accordance with an embodiment of the present invention, a method is provided that includes at least the steps of creating an arc between an electrode and a workpiece; delivering a welding wire to the arc; energizing the welding wire with a current; and utilizing a polarity of the current to change a direction of the arc.

In accordance with an embodiment of the present invention, a welder system is provided that includes at least the following: an orbital welder having a chassis supported adjacent to a workpiece; a welding torch coupled to the chassis that includes an electrode adapted to form a weld joint on a workpiece; a power source that creates an arc between the electrode and the workpiece; a wire feeder that is connected to a supply of welding wire to provide a welding wire to the arc, wherein the arc is a first polarity; means for energizing the welding wire with at least one of the first polarity or a second polarity thereby influencing a direction of the arc; means for influencing at least one of the direction of the arc or a magnitude of the arc with at least one of a strength or a polarity of the energized welding wire; and means for adjusting a location of the welding wire in proximity to the arc.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2A illustrates a side view of an orbital welding system;

DETAILED DESCRIPTION OF THE INVENTION

Embodiments of the invention relate to methods and systems that relate to influencing a direction of an arc within a welding operation. Within a hot wire welding operation, an arc is generated between an electrode and a workpiece and a welding wire is energized while being supplied to a puddle formed by the electrode in order to deposit the liquefied welding wire onto the workpiece. A welder system and/or method is provided that controls a direction of the arc based on at least one of a polarity of the welding wire (via a power supply that energizes the welding wire), a location of the welding wire in proximity to the arc, a synchronization and/or de-synchronization of a polarity of the welding wire with the electrode, an activation and/or a de-activation of energizing of the welding wire, or a combination thereof.

"Welding" or "weld" as used herein including any other formatives of these words will refer to depositing of molten material through the operation of an electric arc including but not limited to submerged arc, GTAW, GMAW, MAG, MIG, TIG welding, or any electric arc used with an orbital welding system.

Figure 1:
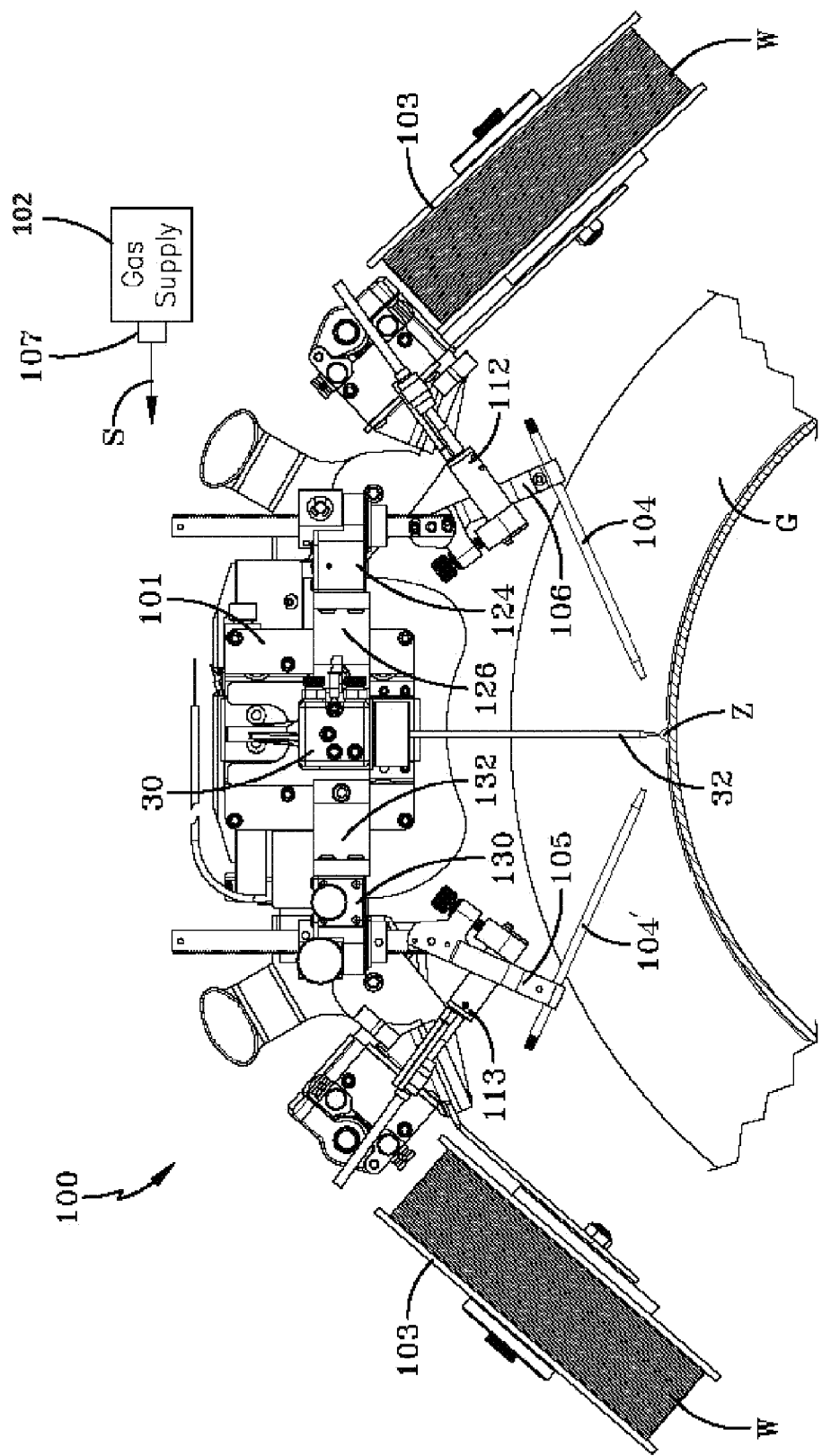
FIG. 1 illustrates a front view of an orbital welding system.
Figure 2B:
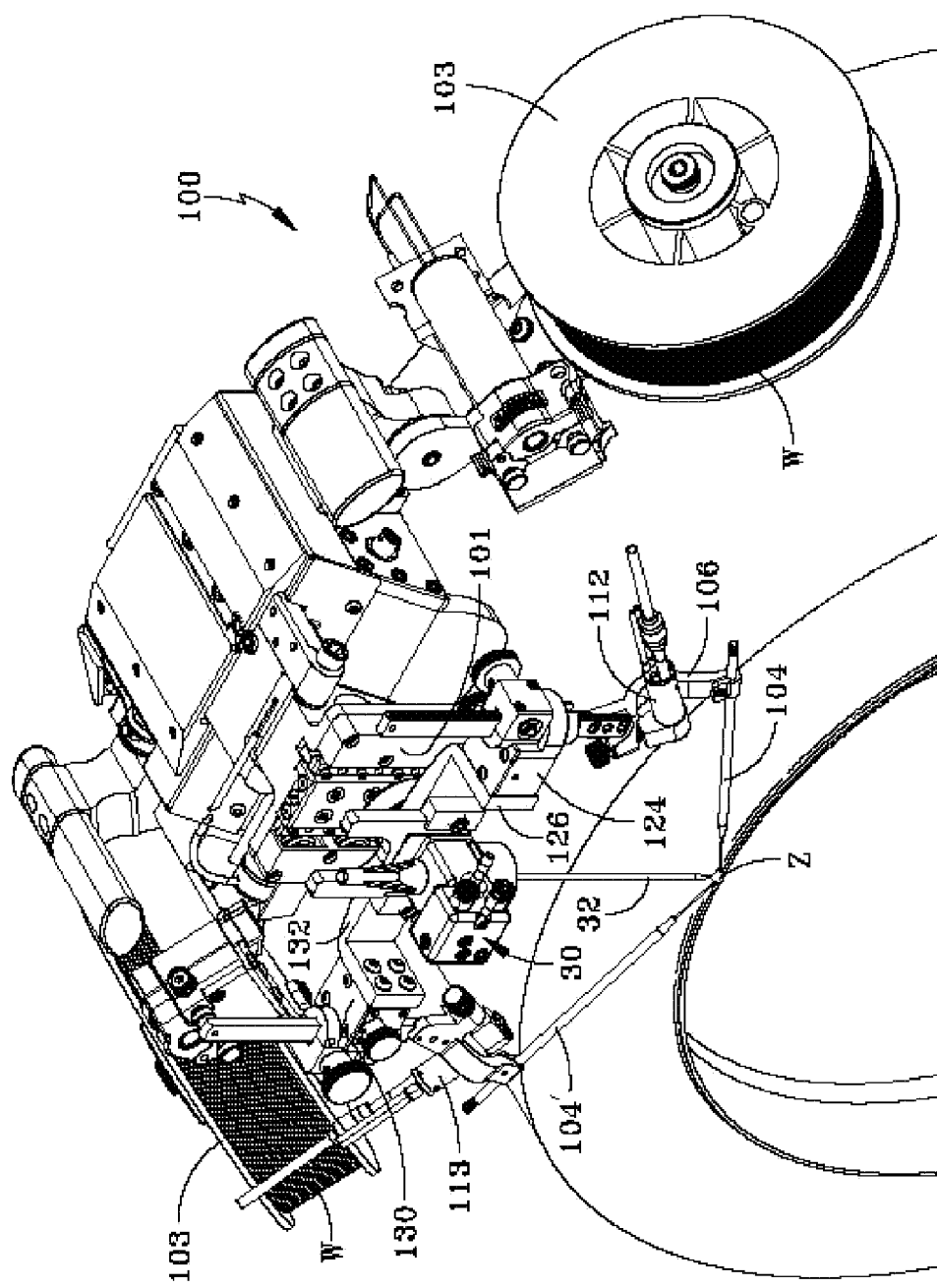
FIG. 2B illustrates a perspective view of an orbital welding system.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-7 illustrates a welding system that is used with an automated or semi-automated welding system. One illustrative example of a welding system is orbital welding, which is often used for the joining of tubes or pipes of various types of materials. For example, a Tungsten Inert Gas (TIG) or Gas Tungsten Arc Welding (GTAW) welding torch may be used to orbit around the pipes to be welded together by an automated mechanical system. FIGS. 1-2B illustrates an example embodiment of orbital welding system 100 (also referred to as welder, system, welding system, and/or welder system) as used in an orbital welding environment. Orbital welding system 100 includes a welding tractor that travels around the pipes or tubes, a welding power source and controller, and a pendant providing operator control. It is to be appreciated that the subject innovation can be used with any orbital or non-orbital welding system. Moreover, the subject innovation can be used with any welding operation that includes an arc and a hot wire that is liquefied to deposit welding material onto a workpiece.

System 100 (as seen in FIGS. 1-2B) is generally used in deep groove welding. In the example shown, welding system 100 includes an orbital TIG welder having a welder body or chassis 101, which may be attached to the work piece or supported on a track. Welder 100 includes a welding torch, generally indicated at 30, having a welding electrode 32 for depositing weld material to form a weld joint at welding zone Z. Electrode 32 is an extended electrode having an electrode length suitable for the groove G being welded. Extended electrode 32 may have any length suitable for a given deep groove weld, including lengths greater than 10 millimeters. As depicted in the example shown, electrode length may be greater than 100 millimeters. The particular example shown has a length of about 120 millimeters. This example is not limiting as electrodes having greater or lesser lengths may be used depending on the depth of the groove G.

Welding torch 30 is connected to a shield gas supply 102, that provides an inert gas, such as Argon gas, to welding torch 30. Welding gas supply 102 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides tungsten wire W to one or more wire guides 104', 104. In the example shown, a pair of extended wire guides 104', 104 are provided and fed by independent spools 103 located on either side of chassis 101. The extended wire guides 104', 104 are supported on first camera device and wire guide system 105 (also referred to as first mount system 105) and second camera device and wire guide system 106 (also referred to as second mount system 106) respectively that are each laterally outward of electrode 32 and above the workpiece or pipe P. It is to be appreciated that the support for the extended wire guides 104', 104 can be chosen with sound engineering judgment without departing from the intended scope of coverage of the embodiments of the subject invention.

The wire guides 104', 104 can include position device (e.g., discussed below in FIG. 4) that provides automated or semi-automated motion, wherein the motion can be in any direction within a 3-dimensional environment in proximity to an arc created within welding zone Z. For instance, the wire guides 104', 104 can extend inward and downward toward electrode 32 and welding zone Z. The example welder is supported on a track and drive by a tractor drive around pipe (also referred to as workpiece W) with wire guides 104', 104 being located in lead and lag positions relative to welding electrode 32. In an embodiment, first mount system 105 is coupled to height adjustment device 130 that allows adjustment of first mount system 105 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 130 is further coupled to support member 132 that is coupled to a portion of chassis 101 of welder system 100. Similarly, second mount system 106 is coupled to height adjustment device 124 that allows adjustment of second mount system 106 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 124 is further coupled to support member 126 that is coupled to a portion of chassis 101 of welder system 100.

First mount system 105 supports camera device 113 and wire guide 104', wherein both camera device 113 and wire guide 104' are positioned to aim on or toward welding zone Z. Similarly, second mount system 106 supports camera device 112 and wire guide 104, wherein both camera device 112 and wire guide 104 are positioned to aim on or toward welding zone Z. It is to be appreciated that system 100 includes camera device 112 and camera device 113 but such devices are solely illustrating various embodiments and is not to be considered limiting on the subject innovation. It is to be appreciated that camera device 113 and wire guide 104' move together (or independently) with welder system 100 which enables supply of welding wire consistently at welding zone Z and/or where wire is feed from wire guide 104'. It is to be appreciated camera device 112 and wire guide 104 together (or independently) with welder system 100 which enables supply of welding wire consistently at welding zone Z and/or where wire is fed from wire guide 104' and ultimately from wire feeder (wire supply or spool 103).

Figure 3A:
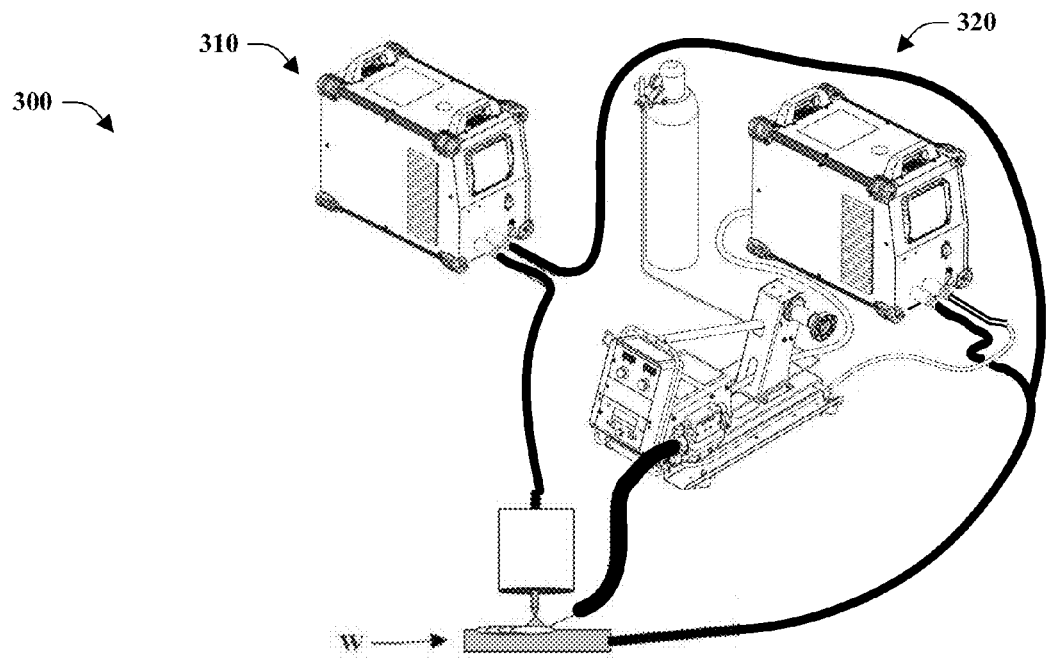
FIG. 3A is a diagram illustrating portion of a hot wire welding system.
Figure 3B:
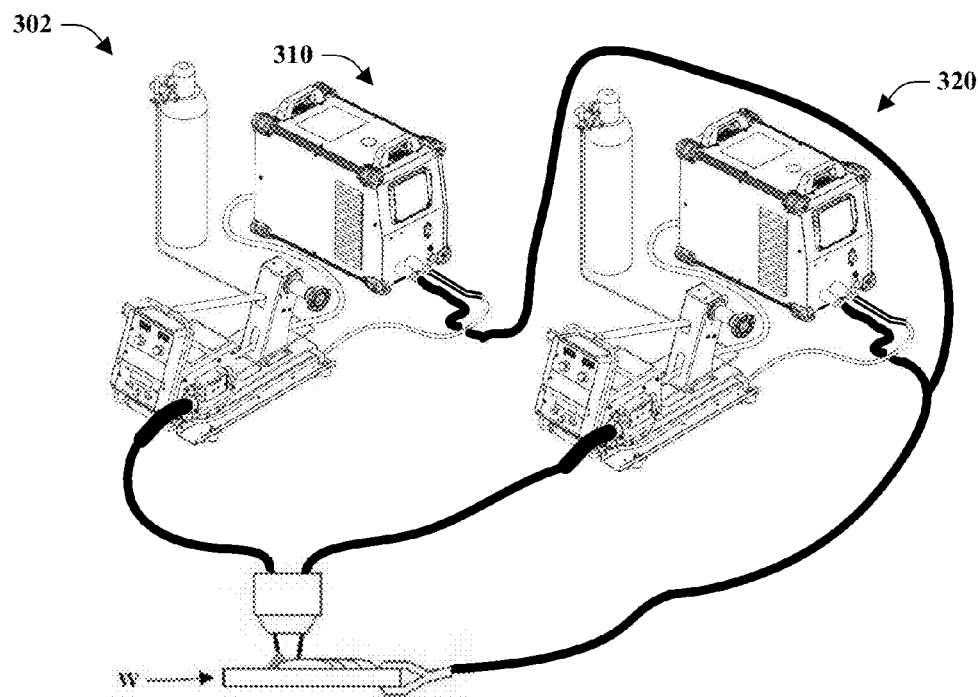
FIG. 3B is a diagram illustrating portion of a hot wire welding system.

FIGS. 3A and 3B illustrate diagrams of a hot wire welding system 300 and a hot wire welding system 302 in accordance with the subject innovation. As discussed above, it is to be appreciated and understood that any suitable hot wire welder system can be implemented with the subject innovation and such systems in FIGS. 1-3B are not to be limiting on the scope of the subject claims. System 300 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100 and 300 can be chosen and used with sound engineering judgment without departing from the intended scope of coverage of the embodiments of the subject invention.

System 302 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100 and 300 can be chosen and used with sound engineering judgment without departing from the intended scope of coverage of the embodiments of the subject invention.

It is to be appreciated that systems 300 and 302 can be a hot wire TIG welder system or a hot wire tandem welder system. The subject innovation can relate to an arc that is created by any suitable wire processes, wherein such wire processes can include non-consumable electrode processes.

Figure 4:
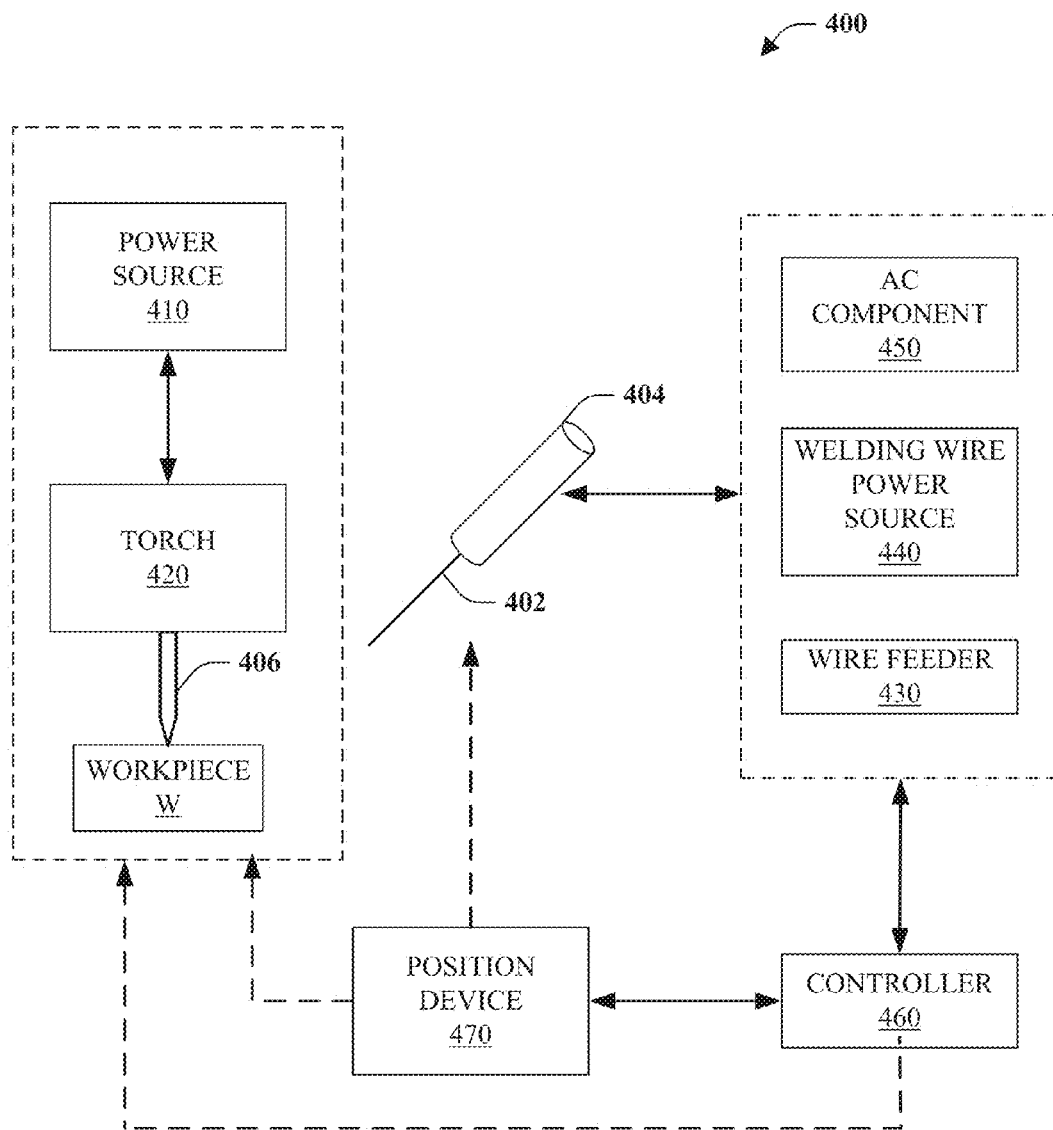
FIG. 4 is a diagram illustrating a welder system that manipulates an arc direction.

FIG. 4 illustrates welder system 400 that manipulates an arc direction. System 400 includes wire guide 404 that directs welding wire 402 to a welding zone that includes an arc (not shown) that is generated between electrode 406 and workpiece W. It is to be appreciated that wire guide 404 can be any suitable member that delivers welding wire 402 from wire feeder 430 to the welding zone. Torch 420 in system 400 includes electrode 406 in which power source 410 creates the arc between electrode 406 and workpiece W. It is to be appreciated that the arc can be a positive (+) polarity in a GMAW welding operation and a negative (−) polarity in a GTAW welding operation.

System 400 can include welding wire power source 440 that can energize welding wire 402, wherein the energizing of welding wire 402 is based on a current. For example, welding wire power source can generate a waveform to energize welding wire 402. Additionally, AC component 450 can provide alternating current (AC) to energize welding wire 402 with a positive polarity (+) and a negative (−) polarity. It is to be appreciated that the AC component 450 can further energize welding wire 402 with a waveform that include a positive (+) polarity or a negative (−) polarity. By way of example and not limitation, the arc can be steered, directed, influenced, manipulated, among others by an amplitude, width (e.g., balance) of the waveform from AC component 450.

System 400 can further include position device 470 that provides movement to at least one of wire guide 404, welding wire 402, workpiece W, torch 420, electrode 406, or a combination thereof. Position device 470 can provide movement in any direction around the arc, toward the arc, among others. By way of example and not limitation, position device 470 can provide an oscillating movement, a motion to a side of the arc, a motion to an opposite site of the arc, a motion toward the arc, a motion away from the arc, a motion above the arc, a motion below the arc, or a combination thereof. In an embodiment, torch 420 includes position device 470 that maneuvers about workpiece W. In another embodiment, position device 470 can change the location of workpiece W in relation to electrode 406. For instance, workpiece W can be rotated under/below torch 420 in, for example, an automation environment. In still another embodiment, position device 470 can be a welder seamer. In still another embodiment, position device 470 can be utilized with wire guide 404 and/or welding wire 402 to change a position or location at which welding wire is delivered to the arc. Still, position device 470 and various configurations thereof can be chosen and used with sound engineering judgment without departing from the intended scope of coverage of the embodiments of the subject invention.

System 400 can include controller 460 that is configured to manipulate a direction of an arc created between electrode 406 (included with torch 420) and workpiece W. Controller 460 can manipulate the direction of an arc based on adjusting one or more welding parameters. By way of example and not limitation, the welding parameter can be a polarity of welding wire (via AC component 450), a change of location for where welding wire 402 is presented to the arc (via position device 470), among others (discussed in more detail below). For example, the arc can have a first polarity and welding wire 402 can be energized with a second polarity, wherein the first polarity and the second polarity can be used by controller 460 to manipulate a direction of the arc. By way of example, an arc can be a positive (+) polarity and welding wire 402 can be energized with a negative (−) polarity which would result in a repulsion between welding wire 402 and the arc. In another example, the arc can be a positive (+) polarity and welding wire 402 can be a positive (+) polarity which would result in an attraction between welding wire 402 and the arc. By way of example, an arc can be a negative (−) polarity and welding wire 402 can be energized with a positive (+) polarity which would result in a repulsion between welding wire 402 and the arc. In another example, the arc can be a negative (−) polarity and welding wire 402 can be a negative (−) polarity which would result in an attraction between welding wire 402 and the arc. In other words, a same polarity between welding wire 402 and the arc can draw the arc toward welding wire 402 and a different polarity between welding wire 402 and the arc can repel the arc away from welding wire 402. When polarities are different between welding wire 402 and the arc, the arc tends to be pushed away. At such time, the arc snaps (e.g., moves) to welding wire 402 up and around a tip thereof. One of sound engineering judgment would recognize this is based on magnetic fields. When the polarity is the same between welding wire 402 and the arc, the magnetic fields cancel each other out between welding wire 402 and the arc. The arc is pushed by the unbalanced magnetic field toward the weak spot in the direction of welding wire 402. In an example, variable polarity can be used so the arc stays in a middle/central location in relation to electrode 406. It is to be appreciated that a magnitude of the arc can be set by a current going through electrode 406 via power source 410, wherein the magnitude of a deflection of the arc is controlled by a magnetic field of welding wire 402. For instance, the magnetic field of welding wire 402 can be controlled by a current of welding wire 402 via welding wire power source 440.

Controller 460 can adjust the polarity of welding wire 402 with a waveform from AC component 450. In addition, controller 460 can adjust the polarity of welding wire 402 by activating and/or de-activating AC component 450 which can turn the polarity of welding wire "on" or "off." For instance, welding wire 402 can be energized with a negative (−) polarity which attracts the negative (−) polarity arc and, upon de-activation of the energizing of welding wire, polarity of welding wire 402 changes and affects the direction of the arc. For instance, welding wire 402 can be energized with a positive (+) polarity which repels the negative (−) polarity arc and, upon de-activation of the energizing of welding wire, polarity of welding wire 402 changes and affects the direction of the arc.

In another embodiment, the electrode included with torch 420 can have a polarity. By way of example and not limitation, the polarity of the arc created between electrode 406 and workpiece can be adjusted. For instance, power source 410 can include an AC component to a waveform that creates the arc between electrode 406 and workpiece. Controller 460 can synchronize or de-synchronize the polarity of welding wire 402 with the polarity of electrode 406 and/or the arc. By synchronizing the polarity of welding wire 402 with the polarity of electrode and/or the arc, the polarities would be the same and attract one another affecting the direction of the arc. By de-synchronizing the polarity of welding wire 402 with the polarity of the electrode and/or the arc, the polarities would be the opposite and repel one another affecting the direction of the arc.

Controller 460 can further influence the direction of the arc based on a location of where welding wire is positioned in relation to the arc. By way of example, position device 470 can be utilized in conjunction with controller 460 to change the direction of the arc. For instance, a negative (−) polarity arc and a negative (−) polarity welding wire 402 will attract one another and a proximity of welding wire 402 to the arc can manipulate the direction of the arc. In such example, moving welding wire 402 closer to the arc can increase the change of direction of the arc and moving welding wire 402 further from the arc can decrease the change of direction of the arc. In other words, by changing the location of where welding wire 402 is in relation to the arc can increase or decrease the polarity affects (e.g., the attraction or repulsion based on similar or opposite polarities between welding wire 402 and the arc).

It is to be appreciated that although one welding wire 402 and one wire guide 404 are illustrated, system 400 and the subject innovation can include two or more welding wires and respective wire guides. Thus, system 400 can provide independent and/or concurrent control of the two or more welding wires and respective wire guides to manipulate the direction of the arc. For instance, for the two or more wires, one or more of the following can be adjusted or controlled in order to influence the direction of the arc: a polarity of welding wire 402; an activation or de-activation of an energizing of welding wire 402; a synchronizing or de-synchronization of polarity between welding wire 402 and the arc; and a location of welding wire 402 in relation to the arc (via position device 470). Moreover, it is to be appreciated that the arc can be a positive (+) polarity in a GMAW welding operation and a negative (−) polarity in a GTAW welding operation and the following examples can be implemented with either polarity for each respective welding operation.

It is to be appreciated and understood that system 400 can include various configurations and embodiments and the configuration in system 400 is not to be limiting on the subject innovation. Wire feeder 430 can be a stand-alone component (as depicted), incorporated into AC component 450, incorporated into welding wire power source 440, incorporated into controller 460, incorporated into position device 470, incorporated into power source 410, incorporated into torch 420, or any suitable combination thereof. Welding wire power source 440 can be a stand-alone component (as depicted), incorporated into AC component 450, incorporated into controller 460, incorporated into wire feeder 430, incorporated into position device 470, incorporated into power source 410, incorporated into torch 420, or any suitable combination thereof. AC component 450 can be a stand-alone component (as depicted), incorporated into controller 460, incorporated into welding wire power source 440, incorporated into wire feeder 430, incorporated into position device 470, incorporated into power source 410, incorporated into torch 420, or any suitable combination thereof. Position device 470 can be a stand-alone component (as depicted), incorporated into AC component 450, incorporated into welding wire power source 440, incorporated into wire feeder 430, incorporated into controller 460, incorporated into power source 410, incorporated into torch 420, or any suitable combination thereof. Moreover, it is to be appreciated that welding wire power source 440 and power source 410 can be separate sources (as depicted), shared, a single power source, or a combination thereof. Controller 460 can be a stand-alone component (as depicted), incorporated into AC component 450, incorporated into welding wire power source 440, incorporated into wire feeder 430, incorporated into position device 470, incorporated into power source 410, incorporated into torch 420, or any suitable combination thereof.

Figure 5A:
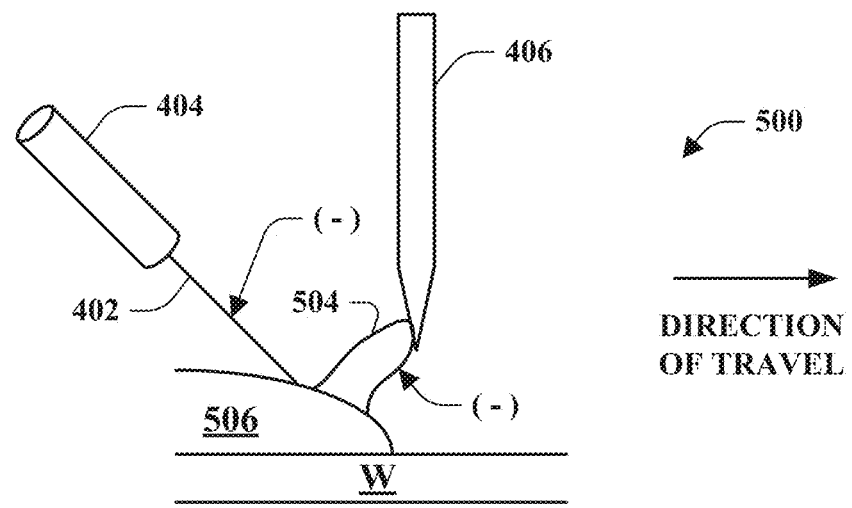
FIG. 5A is a side view of a welding operation that influences a direction of an arc.

FIG. 5A illustrates side view 500 of a welding operation that influences a direction of arc 504. Side view 500 includes arc 504 that has a negative (−) polarity, wherein arc 504 is created between workpiece W and electrode 406. Upon delivery of welding wire 402 via wire guide 404 into the welding zone and ultimately a puddle formed by electrode 406, welding wire 402 is liquefied and becomes deposited welding material 506 into the puddle on workpiece W to fill joint 502. Since welding wire 402 is energized with a negative (−) polarity, arc 504 direction is manipulated to attract to welding wire 402. It is to be appreciated that direction of arc 504 can further be manipulated by controller 460 discussed above (e.g., location/movement of welding wire 402 in relation to arc 504, activation/de-activation of energizing of welding wire 402, synchronization/de-synchronization of polarities between welding wire 402 and electrode 504, amplitude of waveform for energizing welding wire 402, and the like). For instance, welding wire 402 can be located in lag and/or lead in relation to the direction of travel for the welding operation.

Figure 5B:
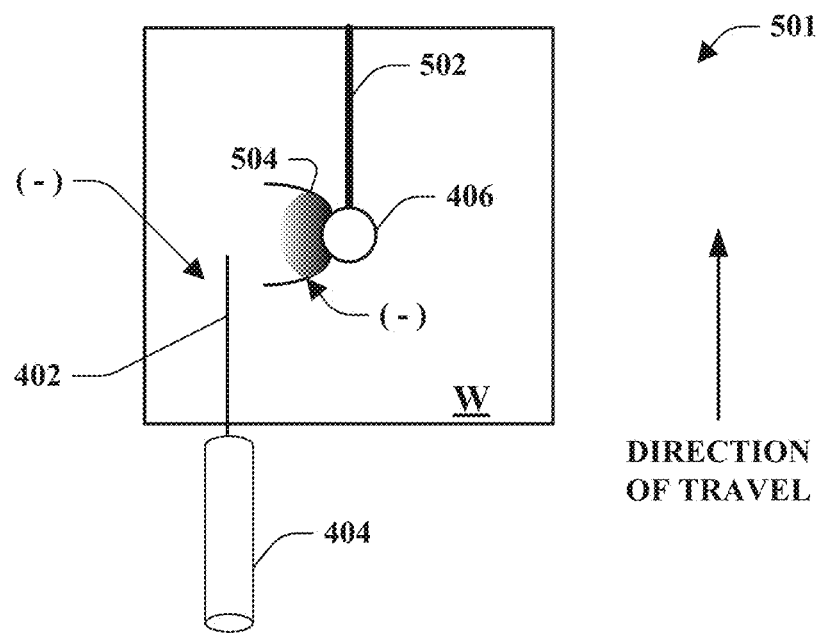
FIG. 5B is a top view of a welding operation that influences a direction of an arc.

FIG. 5B illustrates top view 501 of a welding operation that influences a direction of arc 504. Top view 501 includes arc 504 that has a negative (−) polarity, wherein arc 504 is created between workpiece W and electrode 406. Upon delivery of welding wire 402 via wire guide 404 into the welding zone and ultimately a puddle formed by electrode 406, welding wire 402 is liquefied and becomes deposited welding material 506 into the puddle on workpiece W to fill joint 502. Since welding wire 402 is energized with a negative (−) polarity, arc 504 direction is manipulated to attract to welding wire 402. It is to be appreciated that direction of arc 504 can further be manipulated by controller 460 discussed above (e.g., location/movement of welding wire 402 in relation to arc 504, activation/de-activation of energizing of welding wire 402, synchronization/de-synchronization of polarities between welding wire 402 and electrode 504, amplitude of waveform for energizing welding wire 402, and the like). For instance, welding wire 402 can be located on a side or an opposite side in relation to electrode 406. In another example, welding wire 402 can be located in a lag position or a lead position in relation to the direction of travel. Moreover, two or more welding wires can be utilized in various locations/positions to manipulate the direction of arc 504. It is to be appreciated that a location of where welding wire 402 is placed in relation to electrode 406 can be any suitable location (e.g., above, below, left, right, side, etc., any combination thereof).

Figure 6A:
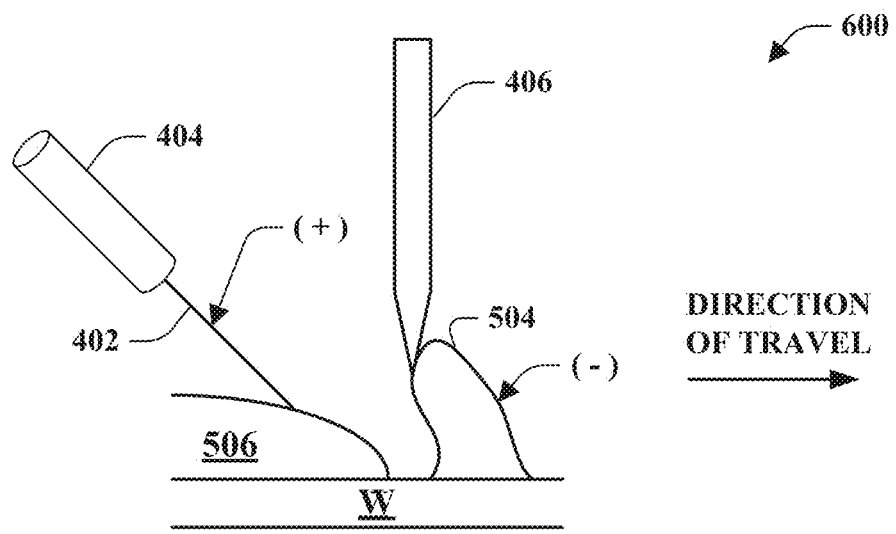
FIG. 6A is a side view of a welding operation that influences a direction of an arc.

FIG. 6A illustrates side view 600 of a welding operation that influences a direction of arc 504. Side view 600 includes arc 504 that has a negative (−) polarity, wherein arc 504 is created between workpiece W and electrode 406. Upon delivery of welding wire 402 via wire guide 404 into the welding zone and ultimately a puddle formed by electrode 406, welding wire 402 is liquefied and becomes deposited welding material 506 into the puddle on workpiece W to fill joint 502. Since welding wire 402 is energized with a positive (+) polarity, arc 504 direction is manipulated to repel from welding wire 402. It is to be appreciated that direction of arc 504 can further be manipulated by controller 460 discussed above (e.g., location/movement of welding wire 402 in relation to arc 504, activation/de-activation of energizing of welding wire 402, synchronization/de-synchronization of polarities between welding wire 402 and electrode 504, amplitude of waveform for energizing welding wire 402, and the like). For instance, welding wire 402 can be located in lag and/or lead in relation to the direction of travel for the welding operation.

Figure 6B:
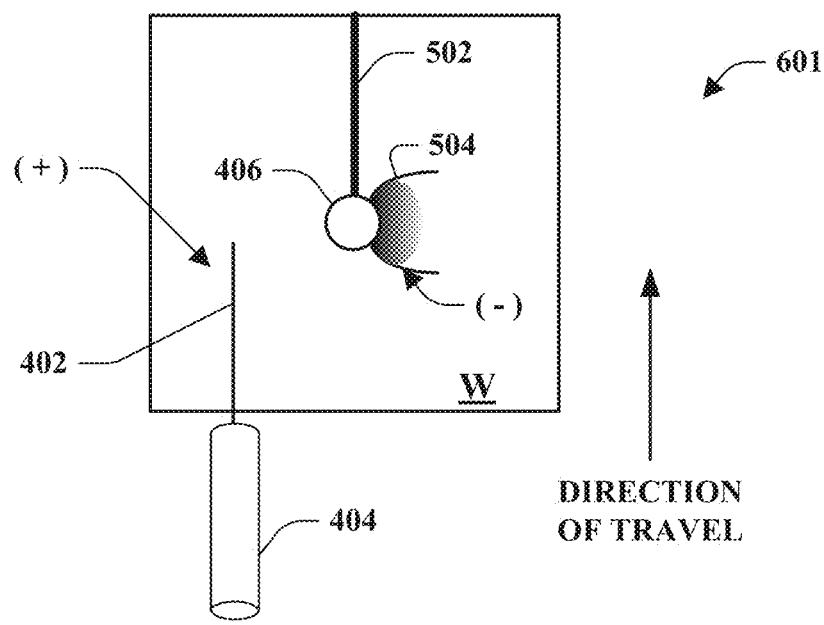
FIG. 6B is a top view of a welding operation that influences a direction of an arc.

FIG. 6B illustrates top view 601 of a welding operation that influences a direction of arc 504. Top view 601 includes arc 504 that has a negative (−) polarity, wherein arc 504 is created between workpiece W and electrode 406. Upon delivery of welding wire 402 via wire guide 404 into the welding zone and ultimately a puddle formed by electrode 406, welding wire 402 is liquefied and becomes deposited welding material 506 into the puddle on workpiece W to fill joint 502. Since welding wire 402 is energized with a positive (+) polarity, arc 504 direction is manipulated to repel welding wire 402. It is to be appreciated that direction of arc 504 can further be manipulated by controller 460 discussed above (e.g., location/movement of welding wire 402 in relation to arc 504, activation/de-activation of energizing of welding wire 402, synchronization/de-synchronization of polarities between welding wire 402 and electrode 504, amplitude of waveform for energizing welding wire 402, and the like). For instance, welding wire 402 can be located on a side or an opposite side in relation to electrode 406. In another example, welding wire 402 can be located in a lag position or a lead position in relation to the direction of travel. Moreover, two or more welding wires can be utilized in various locations/positions to manipulate the direction of arc 504. It is to be appreciated that a location of where welding wire 402 is placed in relation to electrode 406 can be any suitable location (e.g., above, below, left, right, side, etc., any combination thereof).

Figure 7A:
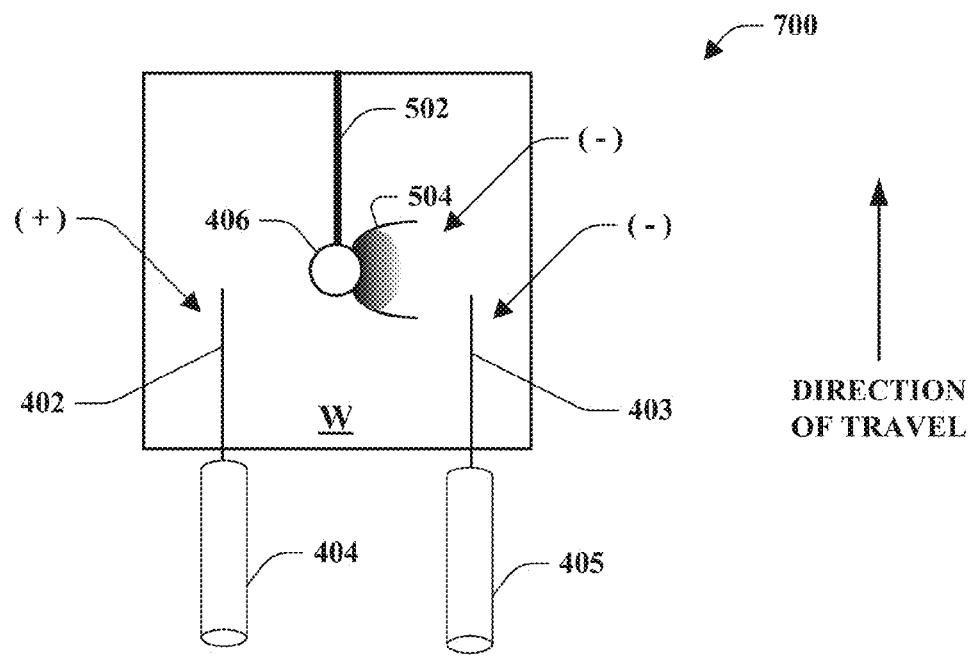
FIG. 7A is a side view of a welding operation that influences a direction of an arc.

FIG. 7A illustrates side view 700 of a welding operation that influences a direction of arc 504. Top view 700 includes arc 504 that has a negative (−) polarity, wherein arc 504 is created between workpiece W and electrode 406. Upon delivery of welding wire 403 via wire guide 405 into the welding zone and ultimately a puddle formed by electrode 406, welding wire 403 is liquefied and becomes deposited welding material 506 into the puddle on workpiece W to fill joint 502. Additionally, wire guide 404 is provided that delivers welding wire 402 into the welding zone and arc 504 to manipulate the direction of arc 504. Since welding wire 402 is energized with a positive (+) polarity and welding wire 403 is energized with negative (−) polarity, arc 504 direction is manipulated to repel from welding wire 402 and be attracted to welding wire 403. It is to be appreciated that direction of arc 504 can further be manipulated by controller 460 discussed above (e.g., location/movement of welding wire 402 and/or welding wire 403 in relation to arc 504, activation/de-activation of energizing of welding wire 402 and/or welding wire 403, synchronization/de-synchronization of polarities between welding wire 402 and/or welding wire 403 and electrode 504, amplitude of waveform for energizing welding wire 402 and/or welding wire 403, and the like). By way of example and not limitation, welding wire 402 is located on one side of arc 504 and welding wire 403 is located on an opposite site of arc 504. It is to be appreciated that the location of welding wire 402 and/or welding wire 403 can be in a lag position or a lead position in relation to the direction of travel. In another embodiment, a third welding wire can be positioned in a lead position to further manipulate the direction of arc 504 as discussed above with controller 460. Moreover, three or more welding wires can be utilized in various locations/positions to manipulate the direction of arc 504. Additionally, one or both of welding wires 402, 403 can be used to deposit welding material on workpiece W concurrently, independently, or a combination thereof.

Figure 7B:
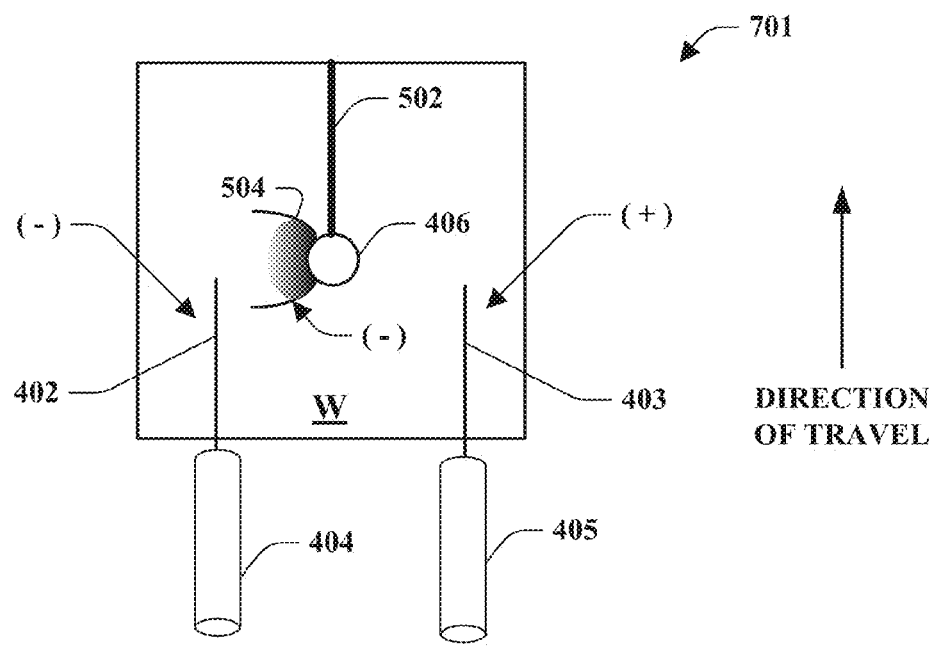
FIG. 7B is a top view of a welding operation that influences a direction of an arc.

FIG. 7B illustrates top view 701 of a welding operation that influences a direction of arc 504. Top view 701 includes arc 504 that has a negative (−) polarity, wherein arc 504 is created between workpiece W and electrode 406. Upon delivery of welding wire 402 via wire guide 404 into the welding zone and ultimately a puddle formed by electrode 406, welding wire 402 is liquefied and becomes deposited welding material 506 into the puddle on workpiece W to fill joint 502. Additionally, wire guide 405 is provided that delivers welding wire 403 into the welding zone and arc 504 to manipulate the direction of arc 504. Since welding wire 403 is energized with a positive (+) polarity and welding wire 402 is energized with negative (−) polarity, arc 504 direction is manipulated to repel from welding wire 403 and be attracted to welding wire 402. It is to be appreciated that direction of arc 504 can further be manipulated by controller 460 discussed above (e.g., location/movement of welding wire 402 and/or welding wire 403 in relation to arc 504, activation/de-activation of energizing of welding wire 402 and/or welding wire 403, synchronization/de-synchronization of polarities between welding wire 402 and/or welding wire 403 and electrode 504, amplitude of waveform for energizing welding wire 402 and/or welding wire 403, and the like). By way of example and not limitation, welding wire 402 is located on one side of arc 504 and welding wire 403 is located on an opposite site of arc 504. It is to be appreciated that the location of welding wire 402 and/or welding wire 403 can be in a lag position or a lead position in relation to the direction of travel. In another embodiment, a third welding wire can be positioned in a lead position to further manipulate the direction of arc 504 as discussed above with controller 460. Moreover, three or more welding wires can be utilized in various locations/positions to manipulate the direction of arc 504. Additionally, one or both of welding wires 402, 403 can be used to deposit welding material on workpiece W concurrently, independently, or a combination thereof.

In an embodiment, the welder system is an orbital welder. In an embodiment, the following is provided: the first polarity is a negative (−) polarity, the second polarity is a positive (+) polarity, and the negative polarity (−) repels the positive (+) polarity; the first polarity is a negative (−) polarity, the second polarity is a negative (−) polarity, and the negative (−) attracts the negative (−) polarity; and the first polarity is a positive (+) polarity, the second polarity is a positive (+) polarity, and the positive (+) polarity attracts the positive (+) polarity. In an embodiment, the controller changes the direction of the arc based on an adjustment of a location of the welding wire in proximity to the arc. In an embodiment, the location of the welding wire is adjusted by movement from at least one of the welding torch, the workpiece, a weld seamer coupled to the workpiece, or the welding feeder. In an embodiment, the direction of the arc is influenced based on an oscillating motion of the welding wire in proximity to the arc.

In an embodiment, a welder system can include an AC component that is configured to energize the welding wire with a waveform with at least one of a negative (−) polarity or a positive (+) polarity. In the embodiment, the AC component energizes the welding wire with at least one of a negative (−) polarity or a positive (+) polarity based on the first polarity or a polarity of the electrode. In an embodiment, the controller influences the direction of the arc based on at least one of an activation of the AC component or a deactivation of the AC component.

In an embodiment, a system is provided that includes a second wire feeder that provides a second welding wire to the arc and the controller influences the direction of the arc with at least one of the second polarity or a polarity of the second welding wire. In the embodiment, the arc is at a center of a plane and the welding wire provided to the arc from the wire feeder and the second welding wire provided to the arc from the second wire feeder are separated by at least 180 degrees relative to the plane. In an embodiment, the welding wire provided to the arc from the wire feeder and the second welding wire provided to the arc from the second wire feeder are separated by at least 90 degrees relative to the plane.

In an embodiment, the controller manipulates the direction of the arc based on at least one of the following: an adjustment of a location of the welding wire relative to the arc; an adjustment of a location of the second welding wire relative to the arc; a change in a polarity of at least one of the welding wire or the second welding wire; a deactivation of an energizing of at least one of the welding wire or the second welding wire; an activation of an energizing of at least one of the welding wire or the second welding wire; a synchronization of a polarity of at least one of the welding wire or the second welding wire with a polarity of the electrode; or a de-synchronization of a polarity of at least one of the welding wire or the second welding wire with a polarity of the electrode.

In an embodiment, the welder system can include a third wire feeder that provides a third welding wire to the arc, a fourth wire feeder that provides a fourth welding wire to the arc, wherein the controller influences the direction of the arc with at least one of the second polarity, a polarity of the third welding wire, or a polarity of the fourth welding wire. In the embodiment, the controller manipulates the direction of the arc based on at least one of the following: an adjustment of a location of the welding wire relative to the arc; an adjustment of a location of the second welding wire relative to the arc; an adjustment of a location of the third welding wire relative to the arc; an adjustment of a location of the fourth welding wire relative to the arc; a change in a polarity of at least one of the welding wire, the second welding wire, the third welding wire, or the fourth welding wire; a deactivation of an energizing of at least one of the welding wire, the second welding wire, the third welding wire, or the fourth welding wire; an activation of an energizing of at least one of the welding wire, the second welding wire, the third welding wire, or the fourth welding wire; a synchronization of a polarity of at least one of the welding wire, the second welding wire, the third welding wire, or the fourth welding wire with a polarity of the electrode; or a de-synchronization of a polarity of at least one of the welding wire, the second welding wire, the third welding wire, or the fourth welding wire with a polarity of the electrode.

Figure 8:
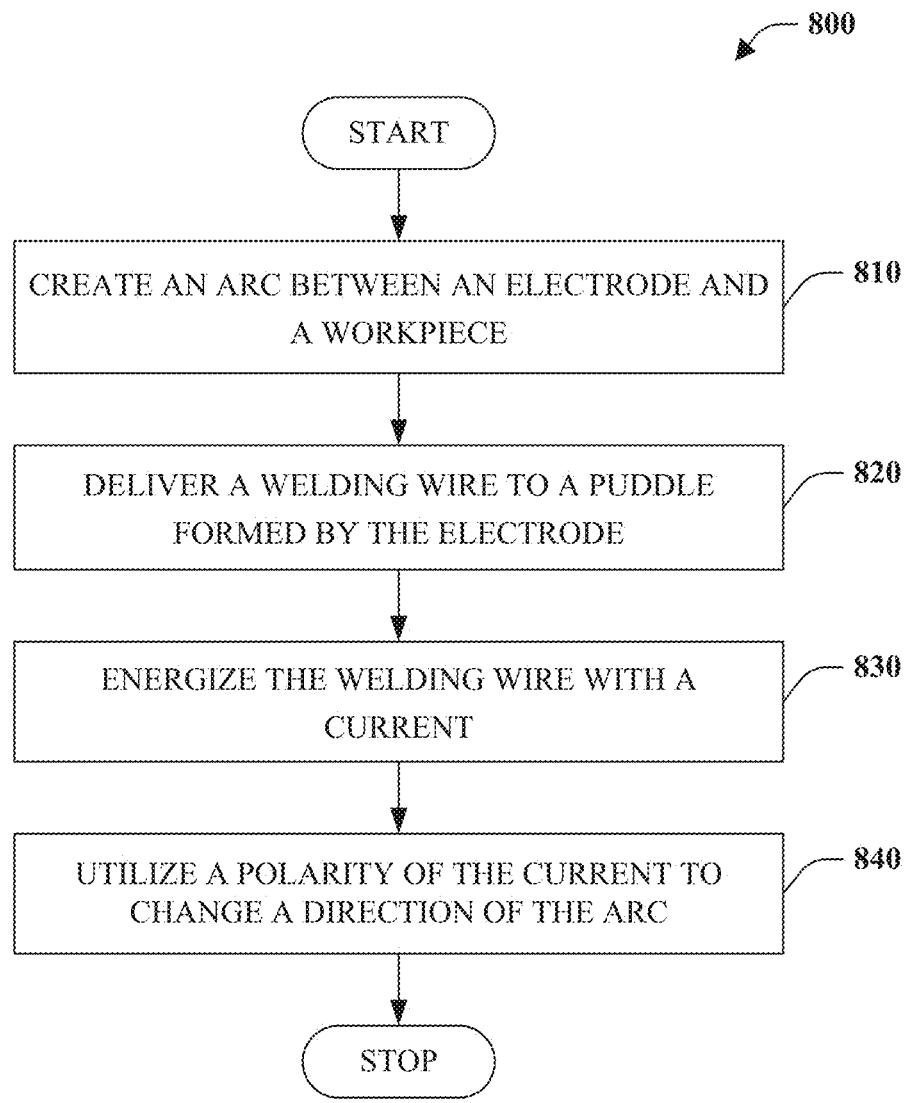
FIG. 8 is a flow diagram of controlling a direction of an arc in a welding operation based on a polarity of current that energizes a welding wire.

In view of the exemplary devices and elements described supra, methodologies that may be implemented in accordance with the disclosed subject matter will be better appreciated with reference to the flow charts and/or methodology of FIG. 8. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 800 of FIG. 8 which is a flow diagram 800 that provides controlling a direction of an arc created during a welding operation. At reference block 810, an arc between an electrode and a workpiece can be created. At reference block 820, a welding wire can be delivered to the arc. At reference block 830, the welding wire can be energized with a current. At reference block 840, a polarity of the current can be utilized to change a direction of the arc.

In an embodiment, a method includes steps of adjusting a location of where the welding wire is delivered to the arc and changing the direction of the arc based on the location. In an embodiment, a method is provided that synchronizes (or de-synchronizes) a waveform of the electrode and a waveform of the welding wire with a phase angle to control the direction of the arc, wherein an in phase of the respective phase angles provides more deflection in comparison to an out-of-phase of the respective phase angles. In an embodiment, the method includes steps of controlling at least one of an activation or a deactivation of said step of energizing the welding wire and changing the direction of the arc based on said step of controlling. In an embodiment, the method can include a step of changing the direction of the arc based on at least one of synchronizing or de-synchronizing the polarity with a polarity of the arc.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
   a welding torch having an electrode;
   a power source configured to output a welding current to the electrode to generate an arc between the electrode and a workpiece, wherein the arc is a first polarity;
   a wire feeder coupled to a supply of welding wire and configured to provide a welding wire to a puddle formed by the arc;
   a welding wire power source configured to energize the welding wire, wherein the welding wire has a second polarity; and
   a controller configured to influence deflection of the arc at least via control of at least one of the power source or the welding wire power source, the controller is further configured to influence deflection of the arc with an adjustment of a location of the welding wire relative to the arc, wherein the arc is deflected along an axis transverse to a direction of travel of the welding torch.

2. The welder system of claim 1, wherein the arc is created from at least one of a gas metal arc welding (GMAW) process such that the first polarity is a positive polarity or a gas tungsten arc welding (GTAW) process such that the first polarity is a negative polarity.

3. The welder system of claim 1, wherein the controller is configured to control at least one of the power source or the welding wire power source so as to adjust at least one of the first polarity or the second polarity such that:
   the first polarity is positive and the second polarity is negative so that a magnetic field of the welding wire repels the arc;
   the first polarity is negative and the second polarity is positive so that the magnetic field of the welding wire repels the arc;
   the first polarity is negative and the second polarity is negative so that the magnetic field of the welding wire attracts the arc; or
   the first polarity is positive and the second polarity is positive so that the magnetic field of the welding wire attracts the arc.

4. The welder system of claim 1, wherein the location of the welding wire is adjusted by movement from at least one of the welding torch, the workpiece, a weld seamer coupled to the workpiece, or the wire feeder.

5. The welder system of claim 1, wherein deflection of the arc is influenced based on an oscillating motion of the welding wire in proximity to the arc.

6. The welder system of claim 1, further comprising an AC component that is configured to energize the welding wire with a waveform having the second polarity.

7. The welder system of claim 6, wherein the controller is further configured to influence deflection of the arc via activation or deactivation of the AC component.

8. The welder system of claim 1, further comprising a second wire feeder that provides a second welding wire to the arc,
wherein the controller is further configured to influence deflection via control of a third polarity of the second welding wire.

9. The welder system of claim 8, wherein the wire feeder and the second wire feeder are arranged such that the welding wire and the second welding wire are respectively provided to opposed sides of the arc.

10. The welder system of claim 8, the controller is further configured to influence deflection of the arc based on at least one of the following:
an adjustment of a location of the welding wire relative to the arc;
an adjustment of a location of the second welding wire relative to the arc;
a change in a polarity of at least one of the welding wire or the second welding wire;
selectively energizing or de-energizing at least one of the welding wire or the second welding wire; or
selectively synchronizing or de-synchronizing a polarity of at least one of the welding wire or the second welding wire with the polarity of the arc.

11. The welder system of claim 1, wherein the electrode is a tungsten-based electrode and the welding current is DC negative.

12. A method of welding, comprising:
generating an arc having a first polarity between an electrode and a workpiece;
delivering a welding wire to a puddle formed by the arc;
energizing the welding wire with a current having a second polarity to generate a magnetic field that interacts with the arc; and
controlling the current and adjusting a location of the welding wire relative to the arc to influence deflection of the arc, wherein the arc is deflected along an axis transverse to a direction of travel of the electrode.

13. The method of claim 12, further comprising at least one of the following:
adjusting a location of where the welding wire is delivered to the arc thereby influencing deflection of the arc based on the location; or
controlling a phase difference between a waveform provided to the electrode and a waveform provided to the welding wire to influence deflection of the arc, wherein in phase waveforms more deflection in comparison to out-of-phase waveforms.

14. The method of claim 12, further comprising:
selectively controlling activation or deactivation of the current energizing the welding wire to thereby influence deflection of the arc.

15. The method of claim 12, further comprising changing at least one of the first polarity or the second polarity to selectively synchronize or desynchronize the first polarity and the second polarity.

16. A welder system, comprising:
an orbital welder having a chassis supported adjacent to a workpiece;
a welding torch coupled to the chassis that includes an electrode;
a power source configured to output a welding current to the electrode to generate an arc between the electrode and the workpiece, wherein the arc is a first polarity;
a wire feeder coupled to a supply of welding wire and configured to provide a welding wire to a puddle formed by the arc;
a welding wire power source configured to energize the welding wire, wherein the welding wire has a second polarity; and
a controller configured to influence deflection of the arc at least via control of at least one of the power source or the welding wire power source and with an adjustment of a location of the welding wire relative to the arc, wherein the arc is deflected along an axis transverse to a direction of travel of the welding torch.

17. The welder system of claim 16, wherein the controller is configured to control at least one of the power source or the welding wire power source such that the first polarity and the second polarity are one of a alike or different.

18. The welder system of claim 16, further comprising a second wire feeder that provides a second welding wire to the arc,
wherein the controller is further configured to influence deflection via control of a third polarity of the second welding wire.

19. The welder system of claim 18, wherein the wire feeder and the second wire feeder are arranged such that the welding wire and the second welding wire are respectively provided to opposed sides of the arc.

* * * * *